July 3, 1928.
T. A. GUILD
MECHANICAL CANE CUTTER
Filed May 29, 1926
1,675,651
4 Sheets-Sheet 1
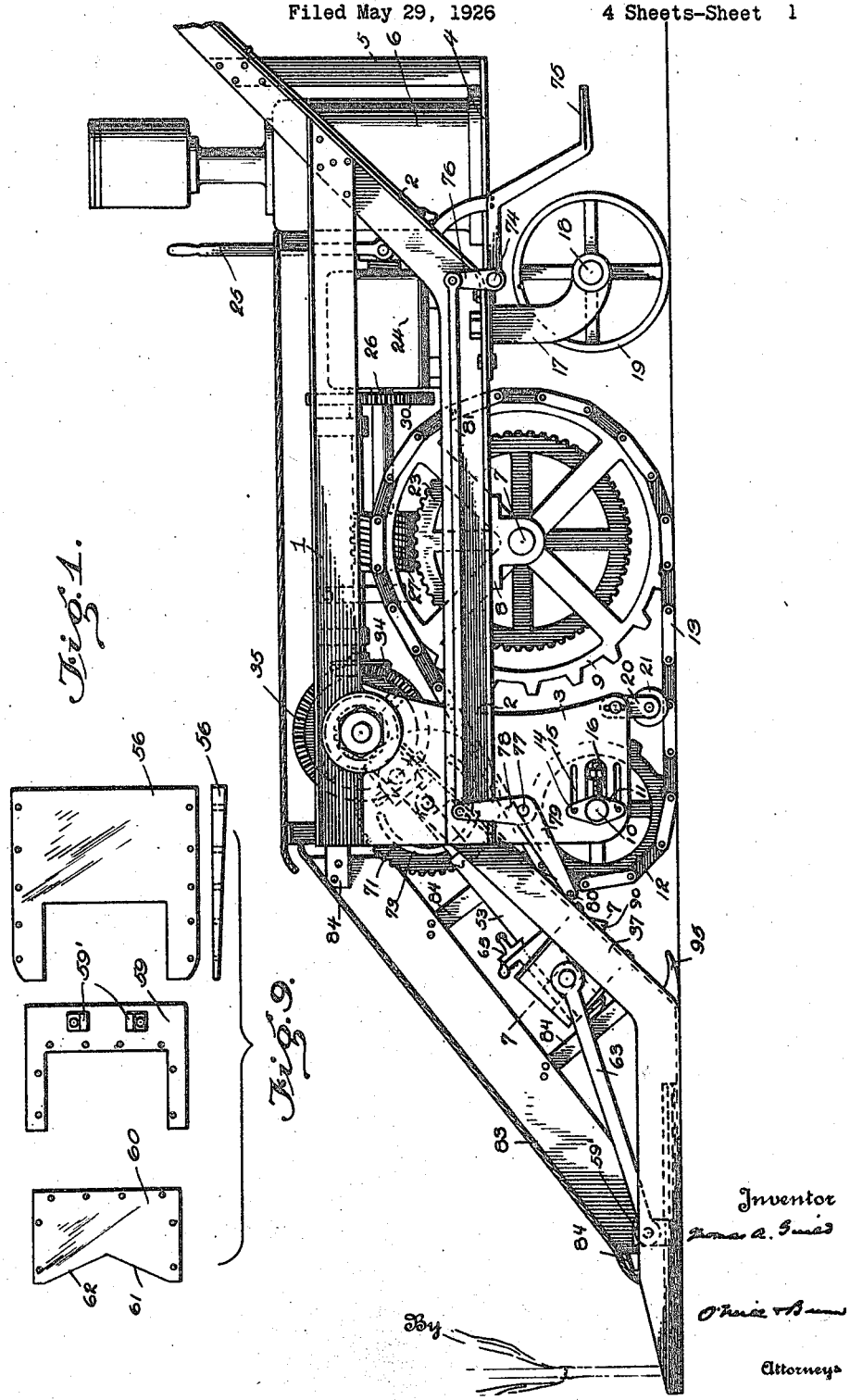

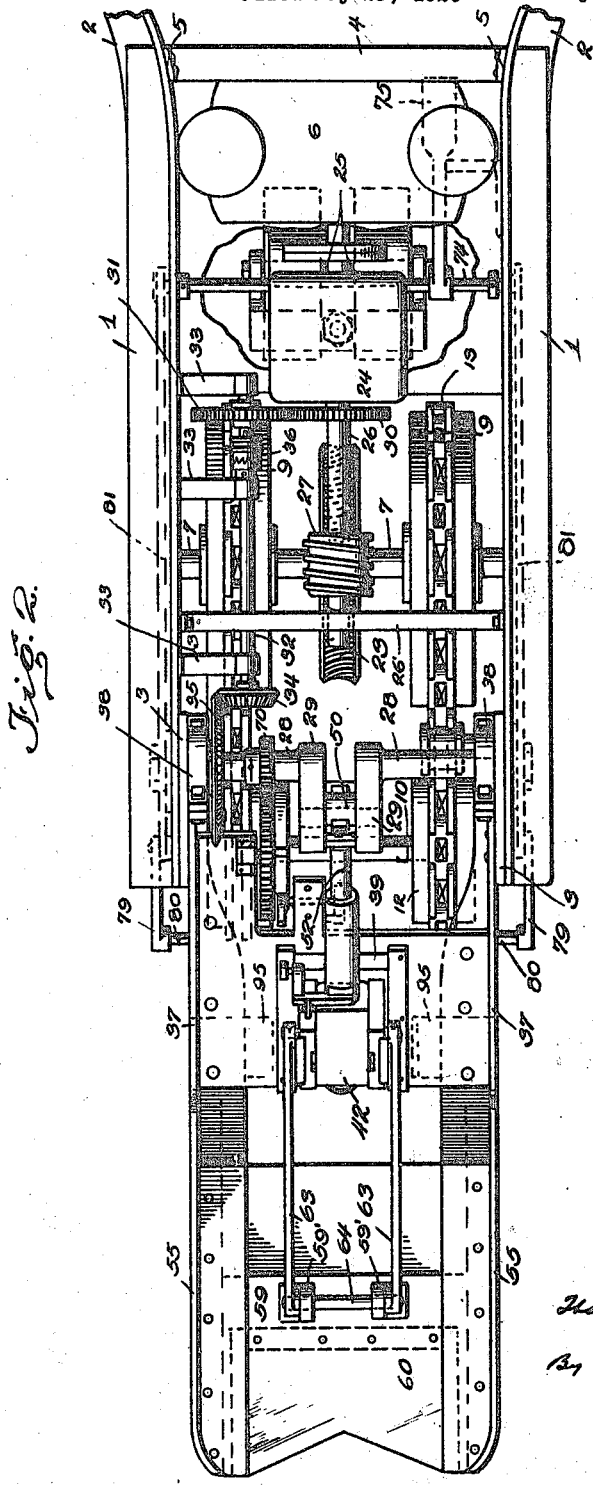

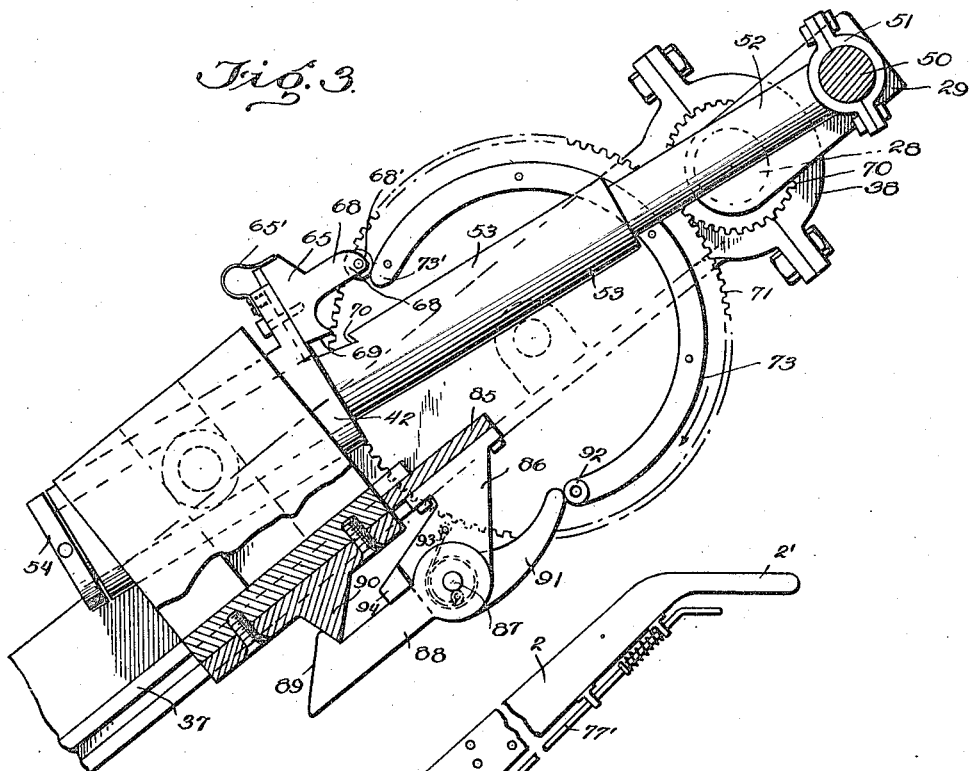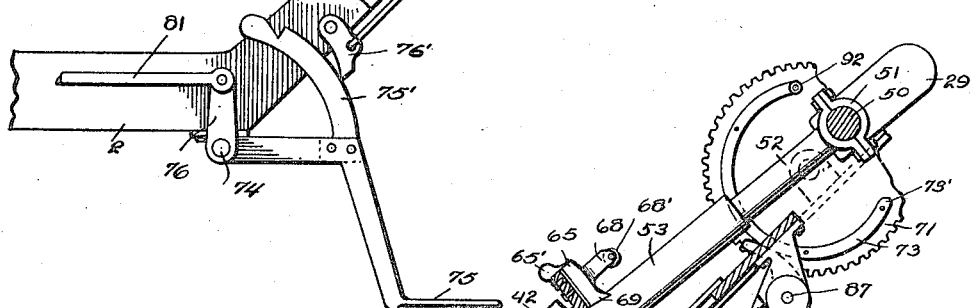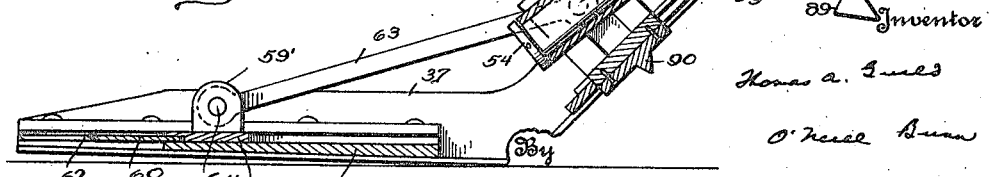

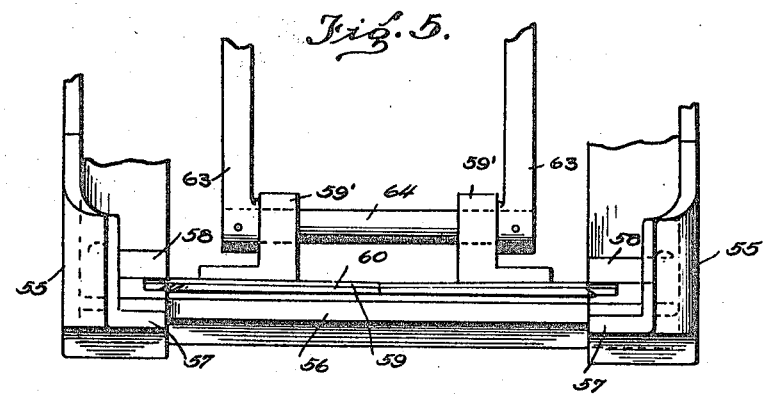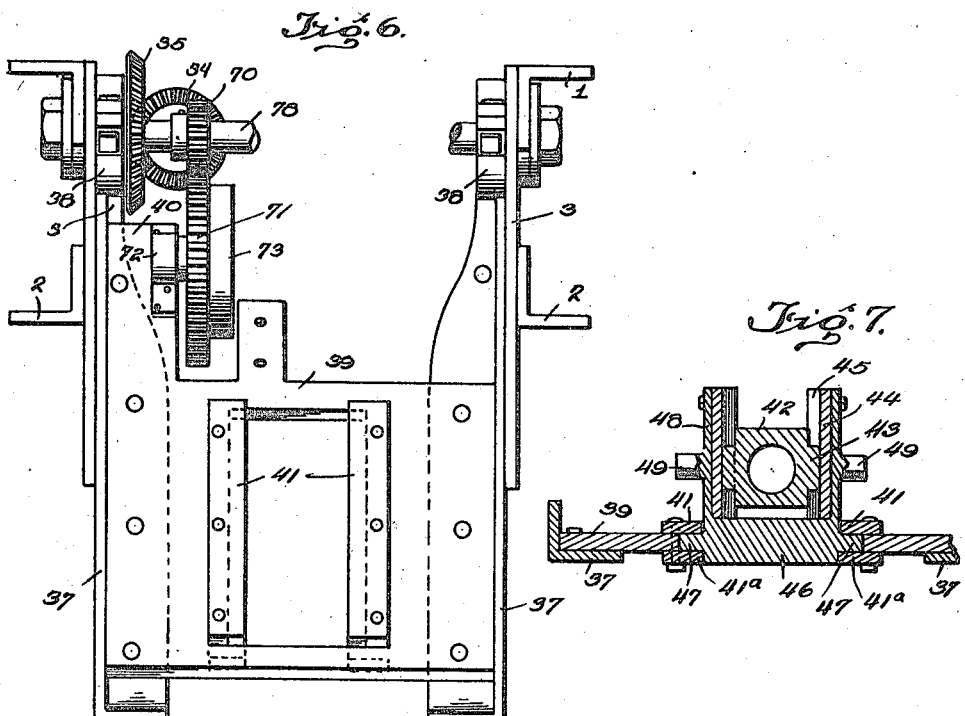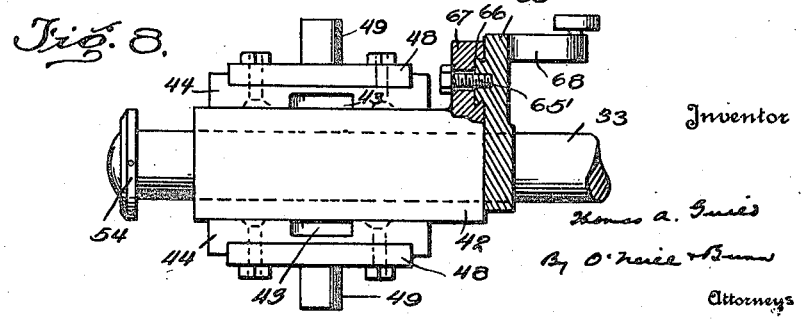

Patented July 3, 1928.

1,675,651

UNITED STATES PATENT OFFICE.

THOMAS A. GUILD, OF HONOLULU, TERRITORY OF HAWAII.

MECHANICAL CANE CUTTER.

Application filed May 29, 1926. Serial No. 112,622.

This invention relates to cutter mechanisms, and more particularly to the provision of an apparatus adapted to mechanically cut cane or corn stalks.

The primary object of the invention is the provision of a machine of the character described which will economically dispense with hand labor in the cane cutting operation, by the substitution therefor of a machine which is controlled by one operator, and which is adapted to perform the work of four or five ordinary manual laborers.

In the application of my invention I provide a travelling carriage mounted on chain tractor devices operated by a motor carried by the machine, and with a cutter knife which is presented to the standing stock, and which is operatively actuated by the motor to perform the desired work. Means are provided for governing the speed of travel of the carriage, and for connecting and disconnecting the driving wheels and motor.

A further object of the invention is the provision of means for automatically controlling the operative action of the cutter knife with respect to the number of rotations of the shaft which drives the latter.

Other objects of the invention will be more particularly pointed out in the accompanying specifications, when taken in connection with the drawings forming a part thereof.

In said drawings:

Fig. 1 is a side elevation of the machine embodying my invention, a portion of the handles being broken away.

Fig. 2 is a top plan view of the machine shown in Fig. 1.

Fig. 3 is an enlarged, fragmentary detail, showing means for automatically governing the stroke of the cutter knife.

Fig. 4 is a side elevation, partly in section, of the cutter knife structure, and the connections to its driving mechanism.

Fig. 5 is a fragmentary front view of the lower end of the guide member carrying the cutter knife.

Fig. 6 is a front plan view of the upper portion of said member.

Fig. 7 is a fragmentary section taken through the cross head and guide member on the line 7—7 of Fig. 1.

Fig. 8 is a top plan view, partially in section, showing the cross head.

Fig. 9 is a detailed view showing the knife structure in unassembled condition, and, Fig. 10 is a fragmentary side elevation of the means for raising and retaining the front end of the apron in adjusted position.

Now referring more particularly to the drawings, in which like reference numerals indicate like parts throughout the several views, the carriage of the machine comprises a rectangularly shaped frame composed of two upper parallel side rails 1, 1, of angle iron, and two similarly shaped lower rails 2, 2. Oppositely positioned rails 1, 1, are connected at the ends each to each, by angle irons, as are also oppositely positioned rails 2, 2. The front ends of the rails 1 and 2 are connected, on each side, by a very strong metal plate 3, as clearly shown in Fig. 1, the irons forming the rails 2 being turned upwardly at the rear and extending into the plane of the rails 1, to which they are secured by rivets or bolts. Beyond the point of attachment to the rails 1, the rails 2 diverge and are brought into parallelism with the rails 1, and provided with grips, (see Fig. 10) to provide handles 2' similar to the handles of plows, as will be understood.

A strong flat base-plate 4 is bolted to each of the rails 2, at the rear ends thereof, and extends rearwardly of said rails, the outer edge of said plate 4 being secured to two struts 5, 5, which are in turn bolted or riveted to the handle extension of the rails 2, 2. The plate 4 forms a support for a motor 6, preferably of the internal combustion type.

The frame-work is mounted on an axle 7, extending through brackets 8 fixed to the lower portions of the rails 2, and forming trunnions for said axle. Upon each projecting end of the axle 7 is mounted a toothed wheel 9. An axle 10 is mounted in bearings 11 provided in the lower portion of the plate 3, and a small toothed wheel 12 is carried on each end of the axle 10. An endless tractor chain 13 surrounds the wheels 9 and 12, on both sides of the carriage. As will be noted in Fig. 1, the bearing 11 is in the form of a bracket secured to the plate 3 by upper and lower headed pins 14, movable in slots 15 provided in the plate 3, and between which slots 15 is an elongated axle-receiving slot 16. The pins 14 are secured to the bracket by nuts, and, as will be understood, are adapted for adjustment longitudinally of the frame to vary the slack in the chain 13.

Extending through the angle bar which connects the rear of the rails 2, 2 each to each, is a forked standard 17 provided with apertures at its ends, the axle 18 of a supporting wheel 19 fitting in said apertures. This structure provides a pivotally mounted supporting wheel at the rear end of the machine. To the lower inner corner of the plate 3, is connected a downwardly extending bracket 20, perforated at its lower end to receive the shaft of a roller 21, which roller rests upon the chain 13 and governs the tension thereof. The bracket 20 carries a pin which extends through a vertically elongated slot in the plate 3, and, by means of a set screw on the end of the pin, the pressure of the roller 21 upon the chain 22 may be governed at will.

It will be understood that the shaft 7 extends transversely beneath the frame, and that there is a wheel 9 and chain 13 on each end of said axle. Midway of the axle 7, as more clearly shown in Fig. 2, and fixed thereto, is a worm gear wheel 23. The shaft of the motor 6 extends into a gear box 24, containing reduction gears, and a clutch, controlled by a lever 25, connects and disconnects the motor shaft to and from the said reduction gears (not shown) the gear reduction being about 15 to 1. The main drive shaft 26 extends outside of the gear box 24, the outer end thereof having bearing in a bracket 26' supported between the rails 1, 1 (see Fig. 2). On the shaft 26 is provided a worm gear 27, in mesh with the worm gear wheel 23 so that rotation of the shaft 26 will cause rotation of the shaft 7 to drive the wheels 9 forwardly, reversal of the shaft 26 operating to drive the wheels 9 rearwardly.

A crank shaft 28 is mounted in bearings provided in the lower edges of the rails 1, 1, near the front of the frame, said shaft 28 carrying a crank arm 29 which is connected to the knife reciprocating means to be hereinafter described. In order to rotate the shaft 28 by the motor 6, the drive shaft 26 is provided with a spur-gear 30, in mesh with a spur-gear 31, carried at the rear end of a counter shaft 32, mounted in bearings provided by straps 33, 33, secured to one of the rails 1. The front end of the counter shaft 32 carries a bevel gear 34, in mesh with a larger bevel gear 35, carried near one end of the crank shaft 28. Clutch mechanism 36 is provided, whereby to connect and disconnect the shafts 32 and 26, as desired. The crank arm 29 controls the action of the reciprocating knife, as will now be described.

An inclined guide-way is provided at the front of the frame, by oppositely disposed L-shaped angle iron members 37, best shown in Fig. 6. Said members are inclined upwardly and the upper ends thereof being formed into straps 38, which encircle and are pivotally secured to the housings of the crank shaft 28. A flat plate 39 is riveted to the members 37, one side of said plate 39 being upwardly elongated at 40. The central portion of the plate 39 is longitudinally slotted, the edges defining the sides of the slot being equipped with narrow metal slats 41, 41, bolted or riveted to the plate 39, and forming a guide-way to receive flanges of a cross-head to be presently described.

As shown in Fig. 8, the cross-head includes an elongated centrally-apertured trunnion 42, provided on each side with projections 43, fitting into slippers 44 carrying sockets 45 adapted to receive said projections 42, and to permit slight vertical movement of the trunnion 42 in the operations to be hereinafter described. The base 46 of the cross-head is provided with laterally extending flanges 47, slidable in the spaces or grooves provided between the oppositely positioned slots 41, 41. The cross-head is provided with side walls 48, each equipped with lugs or pins 49. The slippers 44 are secured to the sides 48 by bolts or rivets.

The cross head as described is positioned as shown in Fig. 7, and is manifestly adapted for sliding movement, the flanges 47 being held between the slats 41, 41.

Secured to the link 50 of the crank 29, by means of the strap 51, is a connecting rod 52, enlarged at 53 in diameter, but adapted to freely pass through the aperture in the trunnion 42, said rod being provided at its lower end with a flanged head 54. With the construction so far explained, it is obvious that, if the cross-head is connected to the rod 52, each rotation of the crank 29 will cause a complete recipocation of said cross head.

To the lower end of the guide-way made up of the members 37, is integrally or otherwise secured a substantially flat knife guide, best shown in Figs. 4 and 5. The guide-way is formed of angle iron members 55, exactly like the members 37, the vertical side walls of the members 55 limiting lateral movement of the knife structure. The knife assembly includes a flat metal base plate 56, preferably tapering towards the front end, as shown in Fig. 9, the front central portion of the plate being removed, as shown. The plate 56 is laid upon the horizontal flanges 57 of the members 55, and angle iron guide slats 58, having their vertical flanges resting upon the flanges 57, are riveted or bolted to the said flanges 57, the rivets extending through the edges of said plate, the horizontal flanges of said slats 58 extending over the side edges of the plate 56, and separated therefrom to provide a guide-way for the knife-carrying plate 59.

As shown in Fig. 9, the knife-carrying plate 59 is narrower than the base plate 56, and is adapted to fit into the guide grooves formed between the slats 58 and the plate 56. Like the base plate 56, the plate 59 is provided with a cut-away portion at its front. Around said cut-away portion the plate 59 is milled out on its lower surface to provide a seat for the knife 60, permitting the top surface of the knife to be positioned flush with the lower surface of the plate 59. The knife 60 is secured to the plate 59, by bolts extending through the side and rear edges of the knife, and through said plate. The rear edge of the plate 59 is provided with two spaced, perforated standards 59′, 59′, adapted for connection with the crosshead, as will presently be explained. The knife 60 is here shown as provided with two inwardly converging cutting edges 61 and 62, both edges being inclined. This structure is deemed preferable, since it has a tendency to gather the stock.

Pivotally connected to the pins 49, 49, carried by the side walls of the cross-head, are reach rods 63, 63, extending downwardly to the standards 59′, 59′, one on each side, the lower ends of each of said rods 63, 63, being pivotally secured to a rod 64 which passes through the apertures in the standards 59′, 59′, whereby to secure the knife plate 59 to the cross-head.

In view of the foregoing it is obvious that, when the rod 53 is connected to the cross-head, each revolution of the crank arm 50 will operate to cause a complete forward and rearward movement of the knife 60.

The speed of the motor shaft is 1,500 R. P. M., the speed of the main drive shaft being approximately 100 R. P. M. The reduction gearing which has been found desirable however, operates to cause the main drive axle 7 to rotate at a speed of two revolutions per minute, but it is essential to efficiency that the speed of the shaft 28 be relatively high, in order to cause a sharp and quick thrust of the knife against the standing cane. Since the machine is travelling very slowly however, and the shaft 28 rotating at a much greater speed than the speed of the shaft 7, to wit, about 54 R. P. M., unless preventive measures were provided the quickly reciprocating knife 60 would cut the same stock more than once, and I have therefore installed the following described mechanism for automatically connecting and disconnecting the knife and the shaft 28.

The trunnion 42 of the cross-head carries a locking dog 65, having a dovetailed tenoned portion 66 which is vertically slidable in a slot formed in a projection 67 of said trunnion, as better shown in Fig. 8. A headed bolt 65′ serves to limit movement of the dog 65, and to adjust its position. The top end of the dog 65 is laterally extended at 68, and carries a laterally extending roller 68′, while the lower end 69 of said dog is shaped to fit into a flat-sided recess 70 provided in the adjacent face of the rod 53, which reciprocates directly under said dog. The dog 65 normally descends to locking position by gravity, or may be under the influence of a weak coiled spring 65′, if desired. It is obvious however that, when the dog 65 is in the position shown in Fig. 4, a rotation of the crank 50 will cause a complete reciprocation of the knife 60. But, as before stated, it is desirable that the knife be not reciprocated with each rotation of the crank 50, it being deemed preferable to reciprocate the knife once for every three rotations of said shaft.

In view of the foregoing I provide a small gear 70 on the shaft 28, in mesh with a large gear 71, mounted on a stub shaft having bearing in a bracket 72 secured to the elongation 40 of the plate 39, as clearly shown in Fig. 6. The gear 70 is one-third the diameter of the gear 71, thereby reducing the speed of rotation of the gear 71 to one-third the speed of rotation of the shaft 28. As clearly shown in Figs. 3 and 4, a cam 73 is formed on the outer face of the gear 71, said cam forming two-thirds of the circumference of a circle described around the center of the gear 71, the cam projecting laterally from said gear, and into the path of vertical movement of the roller 68′ on the extension 68 of the dog 65. In actual operation therefore, when the cam engages the roller 68′, the dog 65 is elevated to lift the end 69 out of the notch 70, and the crosshead is not connected to the rod 53, the latter sliding freely through the trunnion 42, and the knife remaining idle. In Fig. 3 the cam is shown travelling in the direction of the arrow. The cam has elevated the dog 65, and is just about to pass out of engagement with the roller 68′. Immediately upon disengagement, the dog will gravitate, or be depressed by the spring 65′, to the position shown in Fig. 4, the end 69 being engaged in the slot 70, and the downward movement of the rod 53 will then carry the trunnion 42 with it and operate, through the reach rods 63, to propel the knife forwardly. On return movement the head 54 of the rod 53 will contact the trunnion 42 and pull the knife to its rearward position. At this instant the lower end 74 of the cam will have then reached a position under the extension 68 and will lift the end 69 out of slot 70, and, while the dog 65 is disengaged from the slot 70, the rod will make two reciprocations through the cross-head, the knife being idle.

The instrumentalities and gearing are so proportioned, and arranged, that the knife will be projected forwardly a certain distance, cutting the stock during its travel and then be quickly retracted. While the carriage is thereafter moving slowly up to the uncut cane in line with the knife, the latter is idle, the cam 73 having disconnected the knife from the trunnion 42; by the time the front end of the machine is brought into position so that the knife may again engage the standing cane, the cam 73 has released the dog 65 and the knife is again reciprocated as before.

The guideways for the cross-head and for the knife, for the sake of brevity, may be called an apron which is located adjacent the ground, at the front of the machine, during actual operation. As has been before stated, the apron is pivotally supported at the top by the straps 38 which surround the housing of the shaft 28. Normally the front end of the apron is in knife-cutting position near the ground, but, in approaching or leaving the field of operation, or in the event of obstacles in or on the ground, it is necessary or desirable to elevate the front end of the apron. For this purpose I provide a rod 74, rotatable in bearings in the lower surface of the rails 2, to which rod is rigidly secured a pedal 75. A crank arm 76 is secured to each end of the rod 74. A shaft 77 has bearing at each end in the lower portion of the plate 3, and a crank arm 78, having an angled foot 79 is secured to the shaft 77, the lower end of the foot 79 encircling a rod 80, pivotally mounted in brackets fixed to the lower faces of the angle bars 37. The upper ends of the cranks 76 and 78 are joined by a connecting rod 81, and it is obvious that downward pressure upon the pedal 75 will raise the lower end of the apron. Any desired means may be provided for locking the apron in its elevated position, such as the provision of a notched segment 75' connected to the pedal 75, and a locking dog 76', connected to a hand lever 77', extending to a point adjacent the handles 2', as shown in Fig. 10.

A hood 83 is secured by straps 84 in position to cover the front end, or the knife-guiding portion of the apron. The provision of the hood prevents the cut cane from falling into and choking the knife-cutting mechanisms. The hood is in the shape of an inverted V, and the cut cane will fall onto the top of the hood and slide downwardly along either side thereof, to be removed by the cane gatherer.

In view of the foregoing it is believed that the operation of the device is clear. In taking the machine to the field, the apron is elevated and the motor utilized to drive the shaft 7 as explained. When the field is reached the machine is run along the row of standing cane, one man operating the machine, and another gathering the cut stalks.

It is to be noted that the trunnion 42 has a slight vertical movement in the slippers 44, this structure being found desirable in preventing friction and possible rupture, since the rod 53, under the rotation of the crank 50, tends to lift the cross-head, which tendency is relieved by permitting slight vertical movement of the trunnion. The structure of the cross-head, as set forth, allows the latter to adjust itself to any thrusts of the crank 50.

It will also be noted that, when the locking dog 65 is engaged with the rod 53, as shown in Fig. 4, the head 54 of the rod is not in engagement with the lower end of the trunnion. It is also to be observed that the slot 70 has a downwardly sloping top face, parallel to the lower surface of the end 69 of the dog 65. It therefore follows that, when the head 54 moves upwardly into contact with the lower end of the trunnion 42, such movement automatically causes the dog 65 to move upwardly in its slot, so that, when the end 74 of the cam 73 engages under the extension 68 of the dog, the end 69 is already out of the slot 70. This structure therefore constitutes an automatic release of the trunnion from the rod 53.

Unless preventative measures were provided, the inclination of the guide-way members 37, would tend to permit gravitation of the cross-head, when the trunnion 42 is disengaged from the rod 53, thereby preventing proper automatic operation of the mechanisms. In order to guard against this difficulty, I have provided means for positively retaining the cross-head in such position that the end 69 of the dog 65 will always enter the slot 70, when the cam 73 passes out of engagement with the roller 68'. Such means are as follows:

Secured to a plate 85 carried by the members 37, is a bracket 86, as best shown in Fig. 3, the bracket extending downwardly and providing bearings for a pivotally mounted shaft 87, carrying a detent 88. The lower portion of the detent 88 carries a hooked end 89, having an inclined outer face extending into the plane of and adapted for contact by a triangularly shaped lug 90 provided on the lower face of the sliding cross-head. The upper portion of the detent 88 is in the form of an upwardly curved arm 91, having a rounded end which extends into the plane of an anti-friction roller 92, carried on the end of the cam 73. A spring 93 is secured at one end to the bracket 86, and at its other end to the detent 88, the tendency of the spring being at all times exerted to restore the detent to the position shown in Fig. 3.

As shown in Fig. 3, the roller 92 is just coming in contact with the end of the arm 91, and, obviously, further movement of the roller will raise the arm 91 until the hook 87 is disengaged from the lug 90. Simultaneously with the release of the hook 87 from the lug 90, the upper end 73' of the cam 73 passes out from under the roller 68', the parts being so proportioned as to permit this action, and the spring 65′ presses the dog 65 into the slot 70, to the position shown in Fig. 4. Upon the return of the cross-head to its upper position, the end 73′ of the cam 73 will have already passed the end of the arm 91, and the spring 93 will have restored the hook 89 to the position shown in Fig. 3, and the lug 90 will snap under said hook, thereby locking the cross-head in position for a repetition of the cycle of operation. A projection 94 on the bracket 86, limits the movement of the detent 88.

In cutting the stock closely, the front extensions of the knife supports somewhat furrow to a certain extent. On each side of the bottom surface of the knife supporting means, I provide slippers 95, which are wide enough to straddle the furrows and to prevent entrance of the rear end of the apron therein.

Ordinarily it requires 9 cane cutters to cut one acre of sugar cane by hand, in one day. It has been conclusively demonstrated that, with a machine as described, an acre of cane may be cut by one man operating the machine, and two men gathering the stalks and removing the green tops therefrom. Thus, by the use of the machine described, it will not only require a fewer number of operators, but, since they need not be skilled hand cutters, cheaper labor per man may be utilized.

Modifications of the structure herein described may be suggested to those skilled in the art, but my invention covers all modifications falling fairly within the scope of the appended claims.

What I claim is:

1. A cane cutting machine comprising a frame mounted on wheels, a motor carried by the frame and geared to drive said wheels, an inclined guideway pivotally connected to said frame and carrying a reciprocable knife, a crank shaft secured to said knife, and means connecting the motor to said shaft whereby to reciprocate said knife once to every three revolutions of said shaft.

2. A cane cutting machine including a frame carrying a motor, a reciprocable knife, a crank shaft geared to the motor and connected to said knife, whereby to reciprocate the latter upon revolution of said shaft, and interposed means adapted to prevent reciprocation of said knife during certain revolutions of said shaft.

3. A cane cutting machine including a frame carrying a motor and a reciprocable cutter knife, means geared to the motor adapted to operatively reciprocate said knife, and means interposed between the motor and knife, adapted to cause said knife to reciprocate intermittently.

4. A cane cutting machine including a frame carrying a motor and a reciprocable cutter knife, means geared to the motor adapted to operatively reciprocate said knife, and means interposed between the motor and knife, adapted to cause said knife to reciprocate intermittently, said means comprising a cam operated by the motor, and adapted to periodically disconnect said knife from the motor.

5. A cane cutting machine including a frame carrying a motor, an inclined guideway at the front of the machine, a cutter knife reciprocable in said guideway, means geared to the motor for reciprocating said knife, and means for automatically disconnecting the knife from the motor.

6. A cane cutting machine including a frame carrying a motor, an inclined guideway at the front of the machine, a cutter knife reciprocable in said guideway, means geared to the motor for reciprocating said knife, means automatically disconnecting the knife from the motor, and a cam rotating under the influence of the motor and adapted to intermittently disconnect the motor and the knife.

7. A cane cutting machine comprising a frame carrying a motor, a knife reciprocable in a horizontal plane adjacent the ground, means geared to the motor to cause reciprocation of said knife, means for periodically automatically disconnecting the knife from the motor, and means for automatically restoring said connection of the knife to the motor.

8. A cane cutting machine comprising a frame carrying a motor, a knife reciprocable longitudinally of the frame, means geared to the motor to cause a reciprocation of the knife, a cam geared to the motor and adapted to periodically break the connection of the knife to the latter, and means for automatically restoring said connection.

9. A cane cutting machine comprising a frame carrying a motor, a reciprocable crosshead carried by the frame, a reciprocable knife secured to said cross-head, means geared to the motor adapted to cause a reciprocation of said cross-head, a locking dog carried by the cross-head and adapted to automatically move to position to connect the latter to the motor, and means for periodically moving said dog from operative position.

10. A cane cutting machine comprising a frame carrying a motor, a reciprocable crosshead carried by the frame, a reciprocable knife secured to said cross-head, means geared to the motor adapted to cause a reciprocation of said cross-head, a locking dog carried by the cross-head and adapted to automatically move to position to connect the latter to the motor, and a rotating cam adapted to contact said dog and to move it to disconnected position.

11. A cane cutting machine comprising a frame carrying a motor, an inclined guideway connected to said frame, a cross-head reciprocable in said guideway, a knife guide secured to said guideway, a knife reciprocable in said guide and connected to said cross-head, and means for intermittently connecting said cross-head to said motor.

12. A cane cutting machine including a frame, a knife guideway pivotally secured to said frame, and means for elevating the front end of said guideway, said means comprising a pedal adjacent the rear of the machine and crank arms connected to the pedal and to said guideway.

13. A cane cutting machine comprising a frame carrying a motor, a knife reciprocable longitudinally of the frame, means geared to the motor to cause a reciprocation of the knife, means for periodically disconnecting the knife from the motor, and means for detachably securing the knife mechanism in position for connection to the motor.

14. A cane cutting machine comprising a frame, a motor, a reciprocable cross-head carried by the frame, a reciprocable knife carried by said cross-head, means geared to the motor adapted to cause a reciprocation of said cross-head, a locking dog carried by said cross-head and adapted to automatically move to position to connect the latter to said motor, means for detachably retaining said cross-head in position to be connected to said motor, means for periodically releasing said locking dog for movement to operative position, and means operating to simultaneously release said cross-head, substantially as described.

15. A cane cutting machine comprising a frame carrying a motor, a reciprocable cross-head carried by the frame, a reciprocable knife secured to said cross-head, a crank arm geared to the motor, a connecting rod secured to said arm and extending through said head, and co-operating means carried by the head and rod whereby to detachably secure the former to the latter.

16. A cane cutting machine comprising a frame carrying a motor, a reciprocable cross-head carried by the frame, a reciprocable knife secured to said cross-head, a crank arm geared to the motor, a connecting rod secured to said arm and extending through said head, co-operating means carried by the head and rod whereby to detachably secure the former to the latter, and means for intermittently disconnecting said head from said rod.

17. A cane cutting machine comprising a frame carrying a motor, a reciprocable cross-head carried by the frame, a reciprocable knife secured to said head, a connecting rod geared to said motor and adapted to reciprocate independently of said head, co-operating means carried by the head and rod whereby to secure the former to the latter, means for retaining the head in position to be secured to said rod, and means for automatically releasing said head and for simultaneously securing it to said rod, substantially as described.

18. A cane cutting machine comprising a frame carrying a motor, a reciprocable cross-head carried by the frame, a connecting rod driven by the motor and reciprocable adjacent said head, a dog adapted for automatic movement to connect the head to said rod when the head is in a certain position, a detent adapted to retain the head in position to be connected to said rod, and a rotatable cam connected to the motor and normally preventing movement of said dog to operative position, said cam being operative during one of its rotative positions, to simultaneously release said dog and to move said detent to position to release said head, substantially as described.

In testimony whereof I affix my signature.

THOMAS A. GUILD.